United States Patent
Girod et al.

(10) Patent No.: US 6,249,318 B1
(45) Date of Patent: Jun. 19, 2001

(54) VIDEO CODING/DECODING ARRANGEMENT AND METHOD THEREFOR

(75) Inventors: Bernd Girod, Spardorf; Thomas Wiegand, Erlangen, both of (DE)

(73) Assignee: 8×8, Inc., Santa Clara, CA (US)

( * ) Notice: Subject to any disclaimer, the term of this patent is extended or adjusted under 35 U.S.C. 154(b) by 0 days.

(21) Appl. No.: 08/928,356

(22) Filed: Sep. 12, 1997

(51) Int. Cl.[7] .................................................. H04N 7/50
(52) U.S. Cl. ......................... 348/416; 348/402; 348/413
(58) Field of Search ................................. 348/409, 411, 348/412, 413, 415, 416, 402; 382/236; H04N 7/50

(56) References Cited

U.S. PATENT DOCUMENTS

| | | | |
|---|---|---|---|
| 5,151,784 | * 9/1992 | Lavagetto | 348/409 |
| 5,594,813 | 1/1997 | Fandrianto et al. | 382/236 |
| 5,901,248 | * 5/1999 | Fandrianto | 382/236 |

OTHER PUBLICATIONS

"An Error Resilience Method Based on Back Channel Signalling and FEC", ITU Telecommunication Standardization Sector, Stuty Group 15, Working Pary 15/1, Expert's Group on Very Low Bitrate Video Telephony: 6 pages (Jan. 1996).

"Core Experiment N3: Dynamic Sprite and Global Motion Compensation", 1–17 (Undated).

"Proposal for Efficient Coding", International Organisation for Standardisation Organisation Internationale De Normalisation ISO/IEC JTC1/SC29/WG11 Coding of Moving Pictures and Audio: 42 pages (Jul. 1996).

"Transmission of Non–Telephone Signals; Video Coding for Low Bit Rate Communication", International Telecommunication Union, ITU–T Draft H.263,: 149 pages (Sep. 26, 1997).

Chou, P. et al., "Entropy–Constrained Vector Quantization", *IEEE Transactions on Acoustics, Speech, and Signal Processing,* 37(1): 31–42 (Jan. 1989).

Girod, B., "Motion–Compensating Prediction with Fractional–Pel Accuracy", *IEEE Transactions on Communications,* 41(4): 604–612 (Apr. 1993).

Girod, B., "Rate–Constrained Motion Estimation", *SPIE Symposium on Visual Communications and Image Processing* 94: 1–9 (Sep. 1994).

Hepper, D. "Efficiency Analysis and Application of Uncovered Background Prediction in a Low Bit Rate Image Coder", *IEEE Transactions on Communications,* 38(9): 1578–1584 (Sep. 1990).

Kasahara, T., "Core Experiments on Macroblock–Partitionng for Motion Prediction (P2)" and "Core Experiments on STFM/LTFM for Motion Prediction (P3)": 1–25 (Undated).

(List continued on next page.)

*Primary Examiner*—Howard Britton

(57) ABSTRACT

Coding and decoding of video images includes the use of multiple reference pictures and determining motion vector and time delay information for the video images. Video images are quantized and transmitted with the motion vector and time delay information from a first station to a second station. A new video image is predicted for display at the second station as function of the motion parameter codes and multiple reference pictures. The invention may be used in connection with a video communication and/or video conferencing system as a long-term memory predictor to improve image-coding efficiencies and motion compensation. The long-term memory prediction extends the spatial displacement utilized in block-based hybrid video coding by a variable time delay. The arrangement and method employ a proposed bit allocation scheme to provide increased coding efficiencies of the video coder. Applications include video reproduction of repetitive sequences, such as when the video camera is shaking or an image portion is repetitively moving between previously-displayed positions.

8 Claims, 7 Drawing Sheets

OTHER PUBLICATIONS

Orchard, M. et al., "Overlapping Block Motion Compensation: An Estimation–Theoretic Approach", *IEEE Transactions on Image Processing,* 3(5): 693–699 (Sep. 1994).

Stuhlmuller, K. et al., "Rate–Constrained Countour–Representation for Region–Based Motion Compensation", 12 pages, (Undated).

Sullivan, G. et al., "Efficient Quadtree Coding of Images and Video", *IEEE Transactions on Image Processing,* 3(3): 327–331 (May 1994).

Wang, J. et al., "Representing Moving Images with Layers", *IEEE Transactions on Image Processing,* 3(5): 625–638 (Sep. 1994).

Wiegand, T. et al., "Motion–Compensating Long–Term Memory Prediction", Telecommunications Institute, University of Erlangen–Nuremberg, Erlangen, Germany, 4 pages (Undated).

Wiegand, T. et al., "Block–Based Hybrid Video Coding Using Motion–Compensated Long–Term Memory Prediction", Telecommunications Institute, University of Erlangen–Nuremberg, Erlangen, Germany, 6 pages (Undated).

Wiegand, T. et al., "Entropy–Constrained Design of Quadtree Video Coding Schemes", University of Erlangen–Nuremberg, Germany, 5 pages (Undated).

"Line Transmission of Non–Telephone Signals," International Telecommunication Union, ITU–T, H.261: 35 pages (Mar. 1993).

"Draft Text of Recommendation H.263 Version 2 ("H.263+") for Decision," Study Group 16—Contribution Com–999, International Telecommunication Union, ITU–T: 162 pages (Jan. 27, 1998).

Linde, J. et al., "An Algorithm for Vector Quantizer Design," *IEEE Transactions on Communications,* vol. Com.28, No. 1, pp. 84–95 (Jan. 1980).

* cited by examiner

VIDEO CODING/DECODING ARRANGEMENT AND METHOD THEREFOR

FIELD OF THE INVENTION

This invention relates to compression and transmission of video signals and, more particularly, to encoding and decoding temporal redundant information present in video signals.

BACKGROUND OF THE INVENTION

Video signals can be digitized, encoded, and subsequently decoded in a manner which significantly decreases the number of bits necessary to represent a decoded reconstructed video without noticeable, or with acceptable, degradation in the reconstructed video. Video coding is an important part of many applications such as digital television transmission, video conferencing, video database, etc.

In video conferencing applications, for example, a video camera is typically used to capture a series of images of a target such as a meeting participant or a document. The series of images is encoded as a data stream and transmitted over a communications channel to a remote location. For example, the data stream may be transmitted over a phone line, an integrated services digital network (ISDN) line, or the Internet.

The encoding process is typically implemented using a digital video coder/decoder (codec), which divides the images into blocks and compresses the blocks according to a video compression standard, such as the ITU-T H.263 and H.261 standards. In standards of this type, a block may be compressed independent of the previous image or as a difference between the block and part of the previous image. In a typical video conferencing system, the data stream is received at a remote location, where it is decoded into a series of images, which may be viewed at the remote location. Depending on the equipment used, this process typically occurs at a rate of one to thirty frames per second.

One technique widely used in video systems is hybrid video coding. An efficient hybrid video coding system is based on the ITU-T Recommendation H.263. The ITU-T Recommendation H.263 adopts a hybrid scheme of motion-compensated prediction to exploit temporal redundancy and transform coding using the discrete cosine transform (DCT) of the remaining signal to reduce spatial redundancy. Half pixel precision is used for the motion compensation, and variable length coding is used for the symbol representation.

With the above-mentioned coding algorithm, fifteen negotiable coding options can be used, either together or separately. The motion compensation (MC) is often carried out by employing the immediately preceding image which is available as a reconstructed image at encoder and decoder. While long-term statistical dependencies in the coded video sequence have not been fully exploited in existing international standards for improving coding efficiency, a specified negotiable coding option called "Reference Picture Selection Mode" (RPS mode) permits a modified inter-picture prediction called "NEWPRED". This prediction is intended to stop temporal error propagation due to errors. Transmission errors cause different results of the decoding process at encoder and decoder, thereby leading to differently and inconsistently reconstructed frames. The RPS mode can use backward channel messages sent from a decoder to an encoder to inform the encoder which part of which pictures have been correctly decoded at the decoder. The encoder may select one of the picture memories to suppress the temporal error propagation due to the inter-frame coding. A particular picture memory is selected as reference for inter-frame coding of a complete picture, which is represented as a "group of blocks" or a "slice" as specified in the H.263 document. The amount of additional picture memory accommodated in the decoder may be signaled by external means as specified in the ITU-T Recommendations.

The RPS mode is designed to suppress the temporal error propagation due to the inner-frame coding which occurs in case of transmission errors. Techniques to use multiple reference picture in order to achieve the additional goal of improving coding efficiency are being analyzed within the MPEG-4 standardization group. These techniques include schemes known as "Sprites," "Global Motion Compensation," "Short-Term Frame Memory/Long-Term Frame Memory" and "Background Memory" prediction. A commonality of these techniques is that the video encoder can choose between the immediately preceding reconstructed picture and a second picture, either being generated by the prediction technique. While the use of more than a second picture has been exploited when combining various ones of the above techniques, the selection among the reference pictures has been a heuristic approach leading only to small coding gains.

SUMMARY

According to various aspects of the present invention, embodiments thereof are exemplified in the form of methods and arrangements for encoding, decoding and performing video conferencing. One specific implementation includes a method of coding and decoding video images for transmission from a first station to a second station. The method includes: providing respective sets of multiple reference pictures at the first and second stations to permit use of up to frames N for prediction, where N is a positive integer; and at the first station, encoding the video images and determining motion parameters, including a frame selection parameter, for the video images as a function of at least one of: a distortion criteria and a data transmission rate. The encoded video images and the motion parameters are then transmitted to the second station, and a new video image is predicted for display at the second station as function of the motion parameters and a group of the N frames.

Another aspect of the present invention is directed to an arrangement for coding and decoding video images for transmission from a first station to a second station. The arrangement includes: memories for storing respective sets of multiple reference pictures at the first and second stations to permit use of up to frames N for prediction, where N is a positive integer; an encoder responsive to video images provided at the first station and arranged to generate encoded video images; means for determining motion parameters, including a frame selection parameter and a spatial displacement parameter, for the video images as a function of at least one of a distortion criteria and a data transmission rate; and means, responsive to the encoded video images and the motion parameters, for predicting a new video image for display at the second station as function of the motion parameters and a group of the N frames.

The above summary is not intended to provide an overview of all aspects of the present invention. Other aspects of the present invention are exemplified and described in connection with the detailed description.

BRIEF DESCRIPTION OF THE DRAWINGS

Various aspects and advantages of the present invention will become apparent upon reading the following detailed description of various embodiments and upon reference to the drawings in which.

Figure 1:
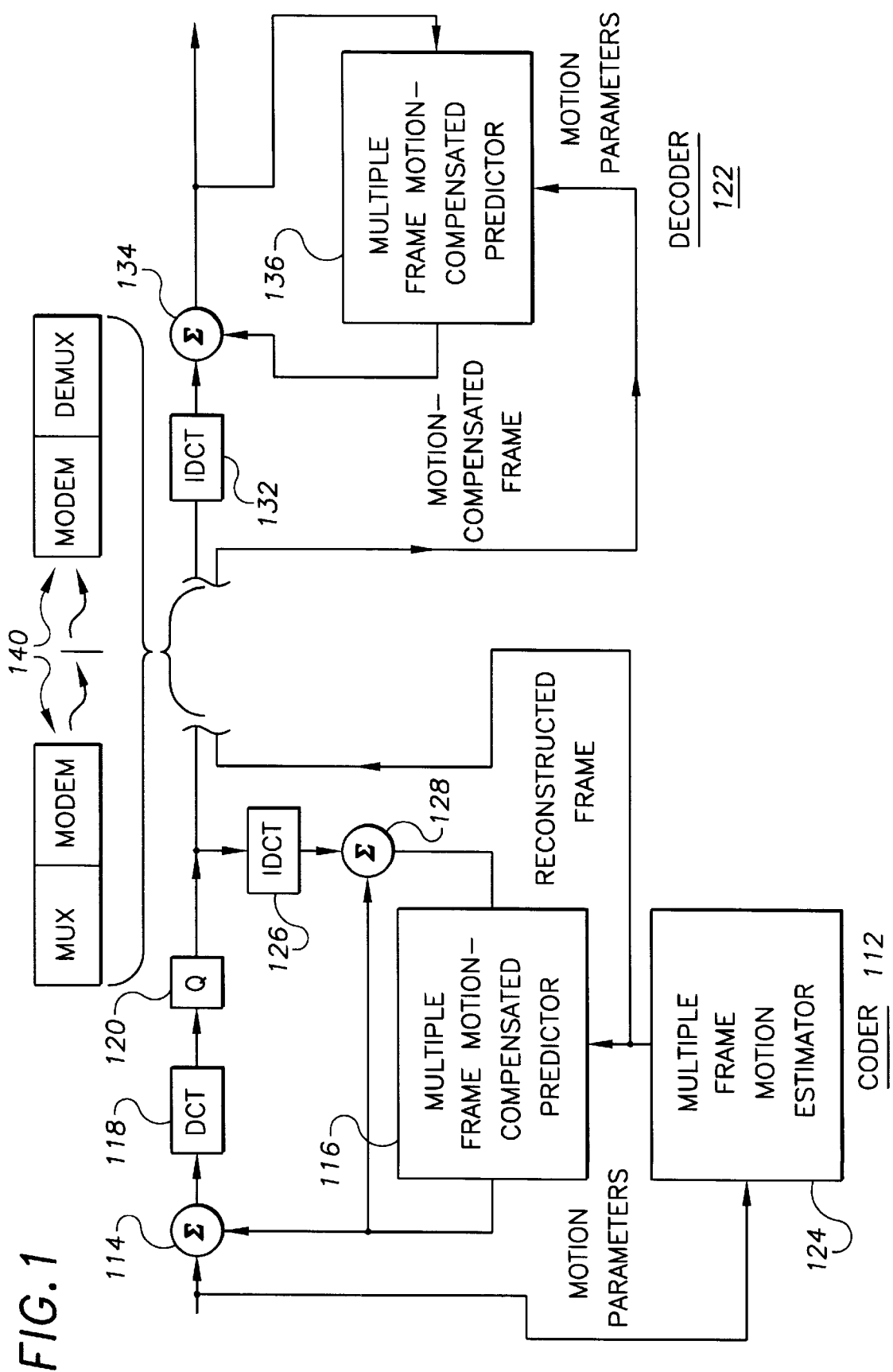
FIG. 1 illustrates a block diagram of a digital video coding system, according to one example embodiment of the present invention.

While the invention is amenable to various modifications and alternative forms, specifics thereof have been shown by way of example in the drawings and will be described in detail. It should be understood, however, that the intention is not to limit the invention to any particular embodiment described. On the contrary, the invention is to cover all modifications, equivalents, and alternatives falling within the spirit and scope of the invention as defined by the appended claims.

DETAILED DESCRIPTION

The present invention is believed to be applicable to a variety of systems and arrangements that transmit images. The present invention has been found to be particularly advantageous in video systems, such as video conferencing applications, in which still images are coded and decoded and transmission efficiency is benefited by motion compensated prediction. While the present invention is not so limited, an appreciation of various aspects of the invention may be obtained through a discussion of various application examples operating in such an environment.

Using a video conferencing system to illustrate an example environment of a video system benefiting from application of the present invention, each of first and second compatible video conferencing stations may include a first terminal that receives and displays images. The images are processed by a codec in the terminal and are transmitted over a communications channel. The second video conferencing station, which may or may not be constructed with the same capabilities as the first video conferencing station, then receives the images over the communications channel and decodes and displays the images.

For transmitting and displaying the video images quickly, the video conferencing system utilizes a video data compression algorithm and a video image prediction algorithm. Using a compression algorithm, the transmitting station (in this instance, the local station) initially compresses the images as a relatively small data packet for efficient transmission over the communications channel in a relatively short period of time. The data packet is received by the remote video conferencing station and is decoded, decompressed and may be then displayed by the second station. Using a prediction algorithm, multiple reference pictures can be used to improve coding efficiency and thereby compensate for video image degradation. This is especially usefull when the video camera is shaking or, as with many video conferencing situations, when the participants' heads are moving repetitively between previously-displayed positions.

FIG. 1 illustrates, in block diagram form, a digital video coding system utilizing a prediction algorithm according to the present invention and useful as part of the above-described video conferencing application. The input to the system is a digital video signal, for example, as provided by a video camera (not shown). The digital video signal is presented to a video coder 112, which is arranged to use a conventional digital video compression coder. In one example embodiment, the coder 112 is a hybrid coder, for instance, implemented so as to conform to the H.263 or MPEG-4 recommendations and situated in the first station of the above video conferencing environment. The coder 112 receives the input video signal at a summing node, or summer 114, which sums the digital video signal with a motion compensated frame. The output of the summer 114 is processed using a discrete cosine transformer (DCT) 118 to provide image blocks as encoded signals manifesting reduced spatial redundancy. From the DCT 118, these encoded signals are then processed using a quantizer 120.

The motion compensated frame is provided from a multiple frame motion-compensated predictor 116, which is in turn to a multiple frame motion estimator 124 and the output of another summer 128. The multiple frame motion estimator 124 determines motion parameters for the coder 112 and the decoder 122 as a function of the video input signal. The summer 128 sums the output of the quantizer 120 and the motion compensated frame, as provided by the multiple frame motion-compensated predictor 116, to produce a reconstructed frame as an input for the multiple frame motion-compensated predictor 116 to generate the next motion compensated frame. The quantized output signal is provided to an inverse discrete cosine transformer (IDCT) 126, which inverses the transformation of the DCT 118, as would a similarly-operating IDCT at a decoder station, such as IDCT 132 of the decoder 122 of FIG. 1. The predictor 116 produces the motion parameters for effecting completion of the feedback at coder 112, and for providing the same information to the decoder 122.

The quantized signals provided by quantizer 120 are then transmitted to a decoder 122 along with motion parameters, for example, motion vector and time delay information. Transmission from the coder 112 to the decoder 122 can occur using a variety of communication-type couplers including but not limited to conventional short-distance communication schemes (e.g., local-area networks, direct wiring, RS422-type wiring) and more remote connecting schemes such as multiplexer-modem/modem-demultiplexer type devices 140 and optic-type equipment (not shown).

Accordingly, at the decoder 122, the similarly-operating IDCT 132 receives the output of the coder 112 to inverse the transform provided by the coder 112. Using another summer 134 and the multiple frame motion-compensated predictor 136, a similar feedback signal and the motion parameters from the coder 112 are provided to effect an arcurate video out signal as depicted at the output port of summer 134.

Figure 2:
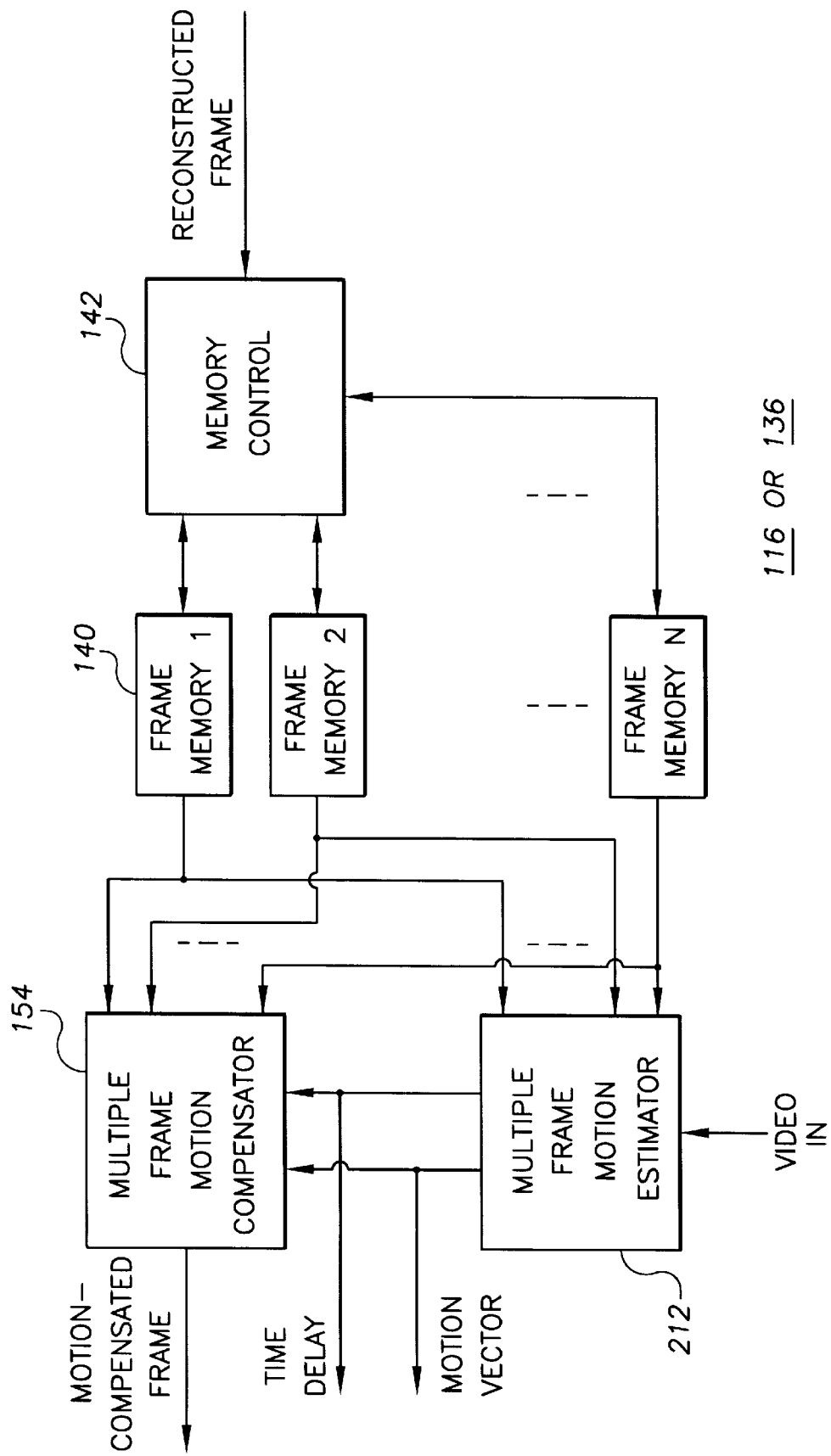
FIG. 2 illustrates an example embodiment of a predictor, according to the present invention.

In the example embodiment of FIG. 2, the multiple frame motion-compensated predictor 116 or 136 includes a memory control 142, frame memories 140, and a multiple frame motion compensator 154. The multiple frame motion-compensated predictor produces a motion compensated frame as a function of motion parameters that are determined by the motion estimator 212 at the first station and received at the second station.

The depicted multiple frame motion compensator 154 is arranged to function as a frame selector and a single frame motion compensator. The frame selection outputs a selected frame from one of the frame memories 140. The single frame motion compensation is responsive to the motion parameters and outputs the motion-compensated frame.

The motion parameters carry the information used by the multiple frame motion compensator to produce the motion-compensated frame given the frame memories. The motion parameters include the frame selection parameters used to reference an image in the frame memories, and the spatial displacement parameters used to reference image samples that are spatially displaced in the referenced frame in accordance to the reference coordinate system.

Different applications can dictate different implementations for the specific information represented by the frame selection parameter. For example, for applications in which the frame memories are arranged in the sliding window approach, the frame selection parameter corresponds to a time delay. For other applications, the spatial displacement parameters can correspond to spatial displacements, for example, where the multiple frame motion compensation utilizes a translational motion model as used in H.263 and MPEG-4. Where the multiple frame motion compensation utilizes an affine or bilinear motion model, the spatial displacement parameters can correspond to polynomial motion coefficients.

For each of the above applications, the multiple frame motion compensation unit decodes the motion parameters into a frame selection parameter and a spatial displacement value to determine the position in the frame memories from which the motion-compensated prediction value is calculated. Where this position coincides with an image sample, this sample is copied. Where this position does not coincide with an image sample the motion-compensated prediction value is calculated by interpolating between surrounding image samples.

The image to be encoded is in general segmented into 1 to S segments, where S is a positive integer. For most applications, these segments are assigned motion parameters.

In the example implementation of the interframe predictor of FIG. 2, the interframe predictor uses a number of frame memories 140 that are arranged using a memory control 142. The memory control 142 may work in several modes of operation. In one mode of operation, a sliding window over time may be accommodated by the memory control unit as depicted in FIG. 2. Using this approach, past decoded and constructed frames, starting with the immediately preceding one and ending with the frame which is decoded N time instants before, are collected in the frame memories 140, individually designated Frame Memory 1 to Frame Memory N. Alternatively, the set of past decoded and reconstructed frames may be subsampled and buffered in the frame memories using a scheme presumed by encoder and decoder. In general, several memory control modes of operation may be defined and the one which is used may be negotiated between encoder and decoder.

In the example implementation, the multiple frame motion estimator 212 performs block-based motion-compensated prediction similar to the H.263 or MPEG-4 recommendations. In addition, the motion estimator 212 references one of the frames out of the frame memory 140 as a frame selection parameter and provides the motion vector and time delay parameters to the decoder 122 and to another part 154 of the interframe predictor, denoted as "multiple frame motion compensator."

A block matching procedure is used to determine the spatial displacement vector and the time delay. According to one embodiment, the criterion for the block motion search is the minimization of the Lagrangian cost function, where a distortion measure for given motion parameters, such as the sum of the absolute differences (SAD) of the displaced frame, and the bit-rate is associated with a particular choice of the spatial displacement and given its predictor.

In order to transmit the time delay, a Huffman code table is generated using a set of training sequences, for example, each with 10 seconds of video encoded at 10 frames/sec. While encoding, histograms are gathered on the time delay parameter to design the Huffman codes which are employed in the next encoding step. The loop is performed until convergence is reached, i.e., the changes in the overall Lagrangian costs become small. The spatial displacements are transmitted, for example, using the H.263 MVD table, as described in ITU-T Recommendation H.263, "Video Coding for Low Bitrate Communication," Draft, December 1995.

The predictor for the spatial displacement ($p_x$, $p_y$) is computed using displacement vectors taken from a region of support (ROS). The ROS includes previously coded blocks that are close spatially and temporally. First, the time delay for the current block is transmitted. Then, the spatial displacement assigned to blocks in the ROS is selected in case their time delay coincides with the time delay of the current block. The result is sorted in descending order of the correlations between the spatial displacement parameters of the current block and the blocks of the ROS. These correlations can be measured off-line for the set of training sequences by conventional block matching with the immediately preceding frames.

According to one example embodiment, the predictor is formed by taking the median from the first three of the sorted spatial displacement vectors. In case there are fewer than three displacement vectors available, only the first displacement vector is used as the predictor if it exists. Otherwise, it may be assumed that the predictor is set to zero. For more details on prediction techniques for long-term memory MCP systems, reference may be made to T. Wiegand, X. Zhang and B. Girod, "Block Based Hybrid Video Coding Using Motion-Compensated Long-Term Memory Prediction," Proc. PCS, Berlin, Germany, for publication September 1997.

Figure 3:
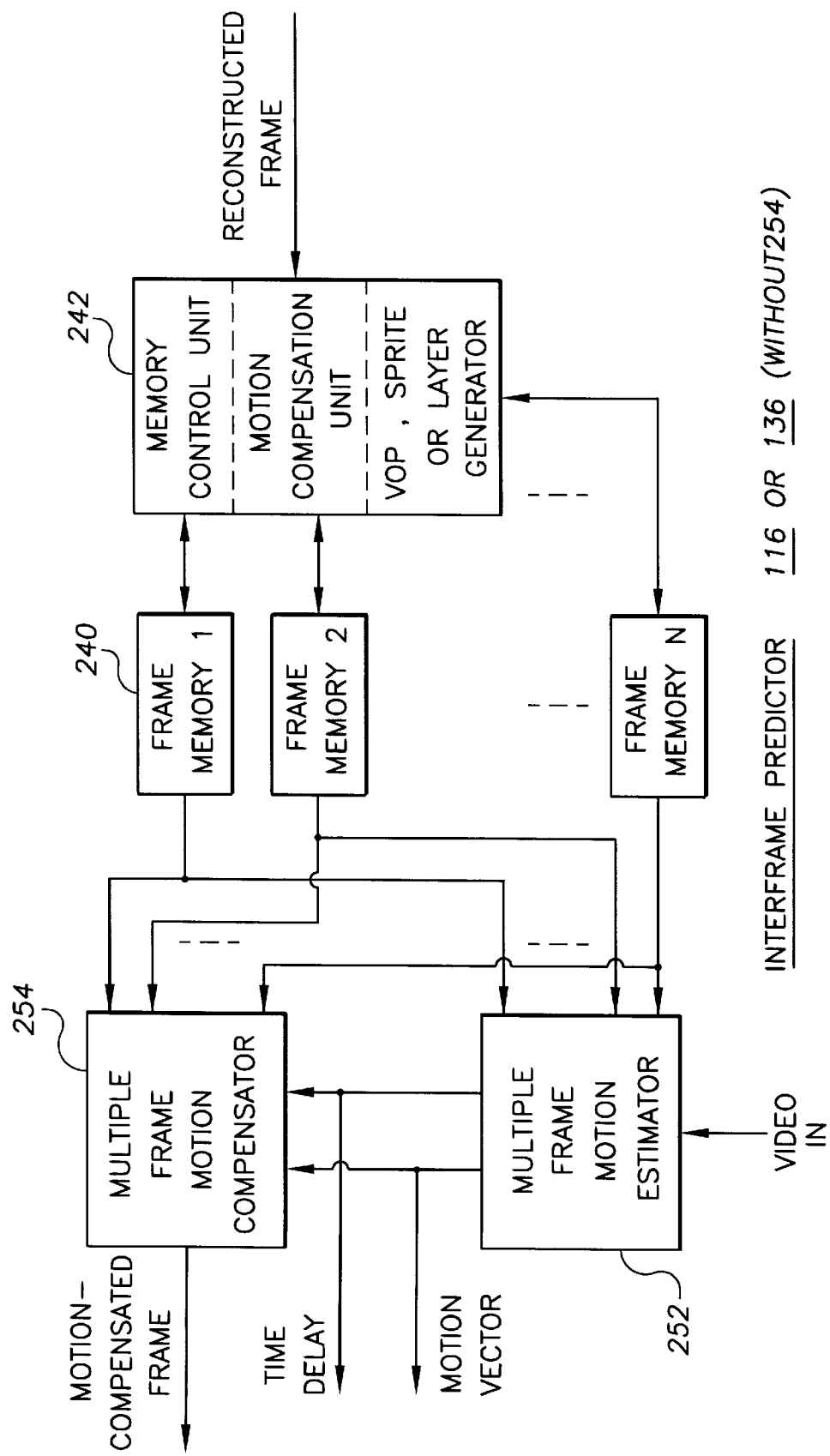
FIG. 3 illustrates another example embodiment of a predictor, according to the present invention.

FIG. 3 illustrates another embodiment of an interframe predictor, also in accordance with the present invention. This embodiment of FIG. 3 uses a number of frame memories that are arranged using the memory control and in addition to that using a motion compensation unit. The frames do not need to be of equal size. Reference coordinate systems are given in correspondence to the video input signal. The motion parameters which are input to the memory control and motion compensation unit are used to generate reference frames according to polynomial motion models, for instance, affine or bilinear motion models. Techniques employed as for Sprites or GMC may as well be utilized to generate reference frames for arrangement in the frame memories. Common with all these techniques is that the polynomial motion models have to be transmitted as side information.

The frame memory may also constitute frames generated by Background Memory estimators. Other layers than the background may also be used to generate reference frames. As in the previously described paragraph, the frames in the frame memory do not need to be of equal size. For frames referring to layers, reference frames may also be generated relating to video object planes (VOPs), as specified in MPEG-4. The frame memory may constitute, for instance, a complete video object (VO) which itself may contain several VOPs.

The multiple frame predictor may be block-based (conforming to H.263 or MPEG-4) or it may be region-based or a combination of both. The region-based multiple frame predictor constitutes the capability to perform motion-compensated prediction using polynomial models, which are, for instance, affine or bilinear motion models. In most cases, the regions are arbitrarily shaped and of larger size than the blocks in H.263 or MPEG-4, and their contours have to be transmitted as side information. However, the implementation discussed herewith does not place such restrictions.

The variable length codes tables to represent the motion parameters that can be used to represent and decode the spatial displacement and time delay for each image sample are generated by a using a set of training sequences, which statistically represents the set of video sequences the application is targeting. The set of training sequences is encoded at a presumed frame rate. The encoding can be implemented by predicting the original video frames given the multiple frame prediction application tools. Alternatively, the encoding method can implemented by integrating the multiple frame prediction apparatus and method into a hybrid video encoder.

In a general implementation, the encoding method is a part of the video encoder or the video encoder itself for which the variable length codes are to be designed. For the above encoding methods, the Lagrange parameter is adjusted to achieve the bit-rate of the motion parameters and/or the other codes of the hybrid video bit stream as it is to be expected for the application targeted. The tables are initialized with fixed length codes. While encoding the set of training sequences by one of the encoding methods described above, histograms are gathered on the motion parameters. These histograms are used to generate variable length code tables, for instance, by a Huffman code generator. These variable length code tables are employed in a next encoding, histogram gathering and variable length code generating step. This loop is continued until a convergence bound is reached, i.e., the changes in the overall Lagrangian cost for all training sequences becomes small.

The prediction of the motion parameters and/or the switching between variable length code tables based on past determined codes in order to lower the bit-rate of the motion parameters is strongly dependent on the multiple frame prediction apparatus.

The relation to the multiple reference frame arrangement is with respect to the prediction and/or the switching between variable length code tables based on past determined codes with respect to the frame selection parameter. In case the sliding window approach is employed, the frames are already arranged in an order which improves prediction efficiency of the frame selection parameter. Otherwise, the frame arrangement in the frame memories should follow an ordering which minimizes the bit-rate needed to transmit the motion parameters.

The relation to the single frame motion compensation unit is with respect to the implemented spatial motion compensation capability and it affects the prediction determined codes with respect to the spatial displacement parameters.

Example approaches for predicting the motion parameters include: linear or affine finite impulse response (FIR) filters; median filters; and other statistical prediction techniques, such as those based on codes relating to the region of support (ROS), that predict the current motion parameters simultaneously at the first and second station.

The motion parameters may be predicted by one of the above-mentioned techniques. The predictor can be used by subtracting it from the frame selection parameters and transmitting the resulting difference to the second station by means of a variable length code table. The predictor may as well be used to constitute the condition for switching between various variable length code tables. All variable length code tables can be determined by the method described above.

Given one of the multiple reference frame predictors, the multiple frame estimator may select one of the frame memories for motion compensation of an image segment. The information to signal which picture is selected for prediction of the image segment is included in the encoded bit stream. The video coder decides upon the way of encoding the video input signal.

The task of such an encoder is very often formulated as to minimize the distortion introduced to the video data while spending only a certain (presumed) amount of bits given the architecture of the video decoder. In general, the encoder has to search all possible parameter combinations in order to determine the best setting. To circumvent this exhaustive search, an unconstrained formulation may be used.

For finding the motion parameters and the frame selection parameter, the search is conducted by minimizing a "Lagrangian" cost function. The Lagrangian cost function constitutes a distortion term being weighted against a rate term by multiplying the rate term with a Lagrange parameter. The value starts with the candidate that is assigned the smallest amount of bit-rate, i.e., being the most probably candidate to outcome the motion search. The Lagrangian costs of this first candidate are computed and assumed to be minimum cost. Then, all remaining candidates in the order of increasing bit-rate are checked for their Lagrangian cost being less than the minimum cost. In case a candidate has lower cost than minimum cost, its cost is assumed to be minimum cost instead and the search is continued until the complete parameter set is checked.

The distortion term is given by a metric in euclidean signal space, or a function of this metric and/or another measure obtained from the video input signal and the frame memories. The metric may be the sum of the absolute differences or the sum of the squared differences between the image segment to be predicted and the candidate segment that is computed by performing motion compensation using the spatial displacement together with the frame selection parameter under consideration. A function of this metric and/or another measure obtained from the video input signal and the frame memories may approximate the distortion after computing the complete hybrid coding loop.

The rate term can be computed by a table lookup for the number of bits needed to transmit the motion parameters and the frame selection parameter given a predictor. The predictor may be computed by various techniques. Approaches for predicting the motion vectors include: linear or affine finite impulse response (FIR) filters, median filters, and based on a Finite State Machine, switching of codebooks.

The VLCs for the spatial displacement and the frame selection parameter are generated in a rate-constrained design procedure for the applied prediction techniques. In this context, the VLCs are initialized with fixed length codes. The encoding of a pre-selected set of video sequences is performed using the video coder for which the VLCs are to be designed. After coding the set of pre-selected video sequences, the accumulated occurrences for the motion parameters and the frame selection parameter are put into a standard Huffman VLC generator obtaining new VLCs for the spatial displacement and the frame selection parameter according to the Huffman algorithm. The encoding step, together with the VLC update using the Huffman algorithm, is repeated until a convergence bound is reached. In addition, in the FIR filter case, the filter coefficients of the predictor are computed by gathering auto- and cross-correlation data on the motion and frame selection parameters. Based on these data, the Wiener equations are solved for each iteration computing the prediction filter for the next iteration.

The linear (affine) predictor may be a vector predictor, i.e., predicting all motion parameters and the frame selection parameter jointly, or a scalar predictor, i.e., predicting all separately. The median filter predictor is computed similarly to the H.263 recommendation for motion parameters and the frame selection parameter. Also, a vector median may be employed for joint prediction. The Finite State Machine-switching of codebooks approach uses the H.263 median or other prediction technique to determine the conditions for switching between codebooks which are designated using the algorithm described above.

The rate term may also be added an estimation of the rate needed to transmit the quantized prediction error signal. This estimation may be based on a function computed from the distortion metric and/or another measure obtained from the video input signal and the frame memories.

The above-described multiple reference picture approach can be integrated into an H.263 video codec, using the H.263 inter-prediction modes INTER, INTER-4V, and UNCODED extended to long-term memory MC. The UNCODED mode is an INTER mode for which the COD bit indicates copying the macroblock from the previous frame without residual coding, as is discussed in ITU-T Recommendation H.263, "Video Coding for Low Bitrate Communication," Draft, December 1995. The INTER and UNCODED mode are assigned one code word representing the variable time delay for the entire macroblock. The INTER-4V utilizes four time parameters each associated to one of the four 8×8 motion vectors.

The H.263 coder and the long-term memory coder are operated using a modified encoding strategy as utilized by the TMN-2.0 coder, which is the test model for the H.263 standard. The TMN-2.0 codec is available via anonymous ftp to bande.nta.no. The encoding strategy differs for the motion estimation and the mode decision, where the instant approach is motivated by rate-distortion theory.

In principle, the problem of optimum bit allocation to the motion vectors and the residual coding in any hybrid video coder can be viewed as a non-separable problem requiring a high amount of computation. To circumvent this joint optimization, the problem can be split into two parts: the motion estimation and the mode decision.

The motion estimation is performed as described above using the minimization of the Lagrangian cost function. For each frame the best motion vector using SAD is found by full search on integer-pel positions followed by half-pel refinement. The integer-pel search is conducted over the range [−16 . . . 15]×[16 . . . 15] pels. The impact of overlapped block motion compensation is neglected in the motion estimation.

Given the displacements for a particular mode that may be UNCODED, INTER or INTER-4V, the overall rate distortion costs are computed. The differences between the reconstructed and the original frame, and the rate is computed including the rates of macroblock headers, motion parameters, and DCT quantization coefficients. In case of long-term memory MCP, the motion estimation followed by the mode decision is conducted for each frame in the frame buffer.

Since there are now two Lagrangian cost functions to be minimized, two different Lagrange multipliers are used: one for the motion search ($\lambda_{motion}$), the other one for the mode decision ($\lambda_{mode}$). Furthermore, the distortion measures differ because of complexity reasons. Hence, the selection of the Lagrange parameters remains rather difficult in the instant coder. In this work, used is the heuristic $$\lambda_{motion} = \sqrt{\lambda_{mode}},$$

which appears to be sufficient. The parameter $\lambda_{mode}$ itself is derived from the rate distortion curve that is computed using the TMN-2.0 H.263 coder.

The performance of the above-illustrated technique is shown in FIGS. 4A, 4B, and 5A and 5B, with the results obtained for the test sequence Foreman and Mother-Daughter, respectively. These sequences were not part of the training set. The Huffman codes for the time delay are trained for various memory sizes but only for one λ. The coder is run with constant quantizer when coding 100 frames at 10 frames/s. All results are generated from decoded bit streams.

Figure 4A:
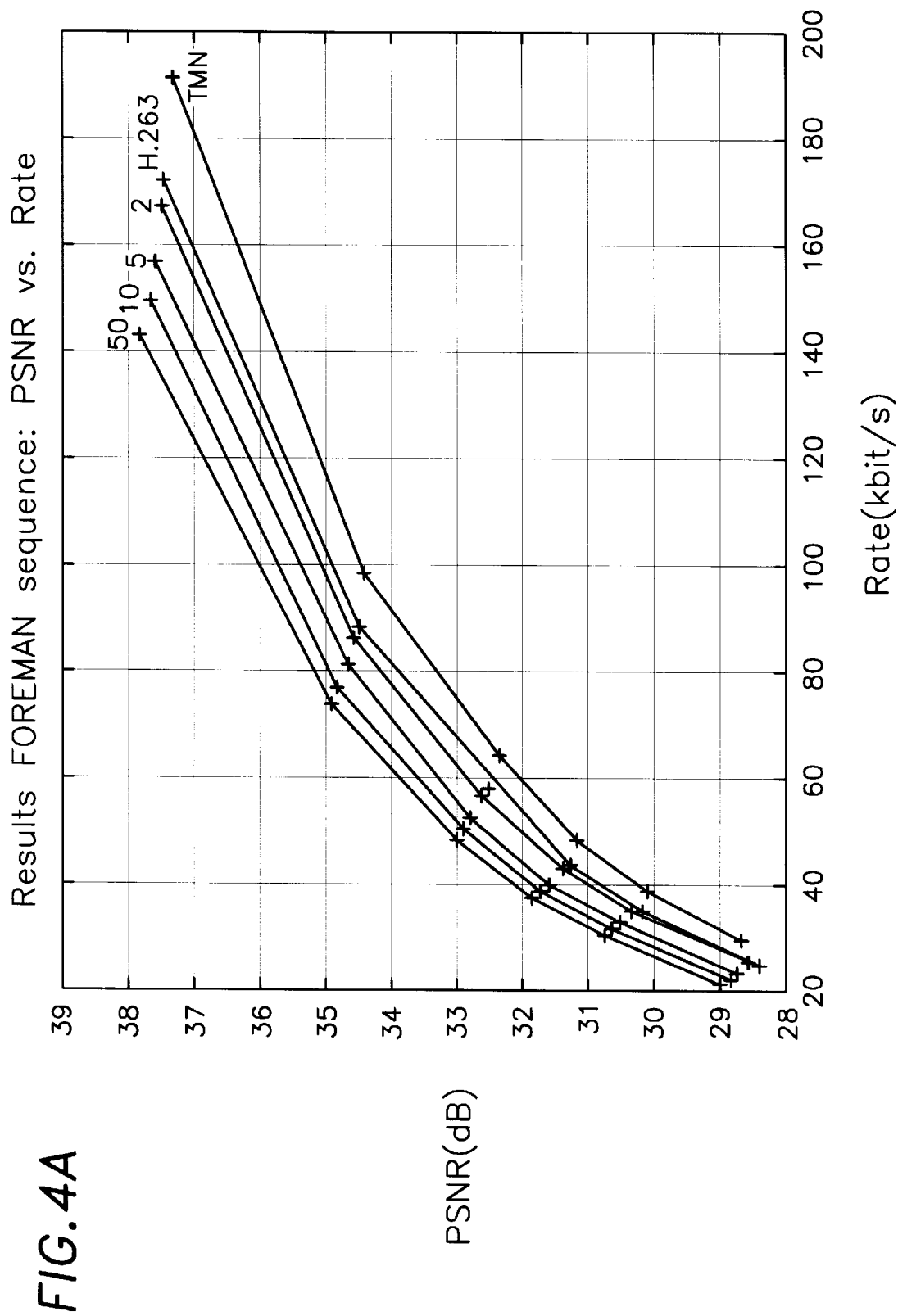
FIG. 4A shows the average PSNR with the rate distortion and the long-term memory prediction codec versus overall bit-rate for an example predictor arrangement according to the present invention.
Figure 5A:
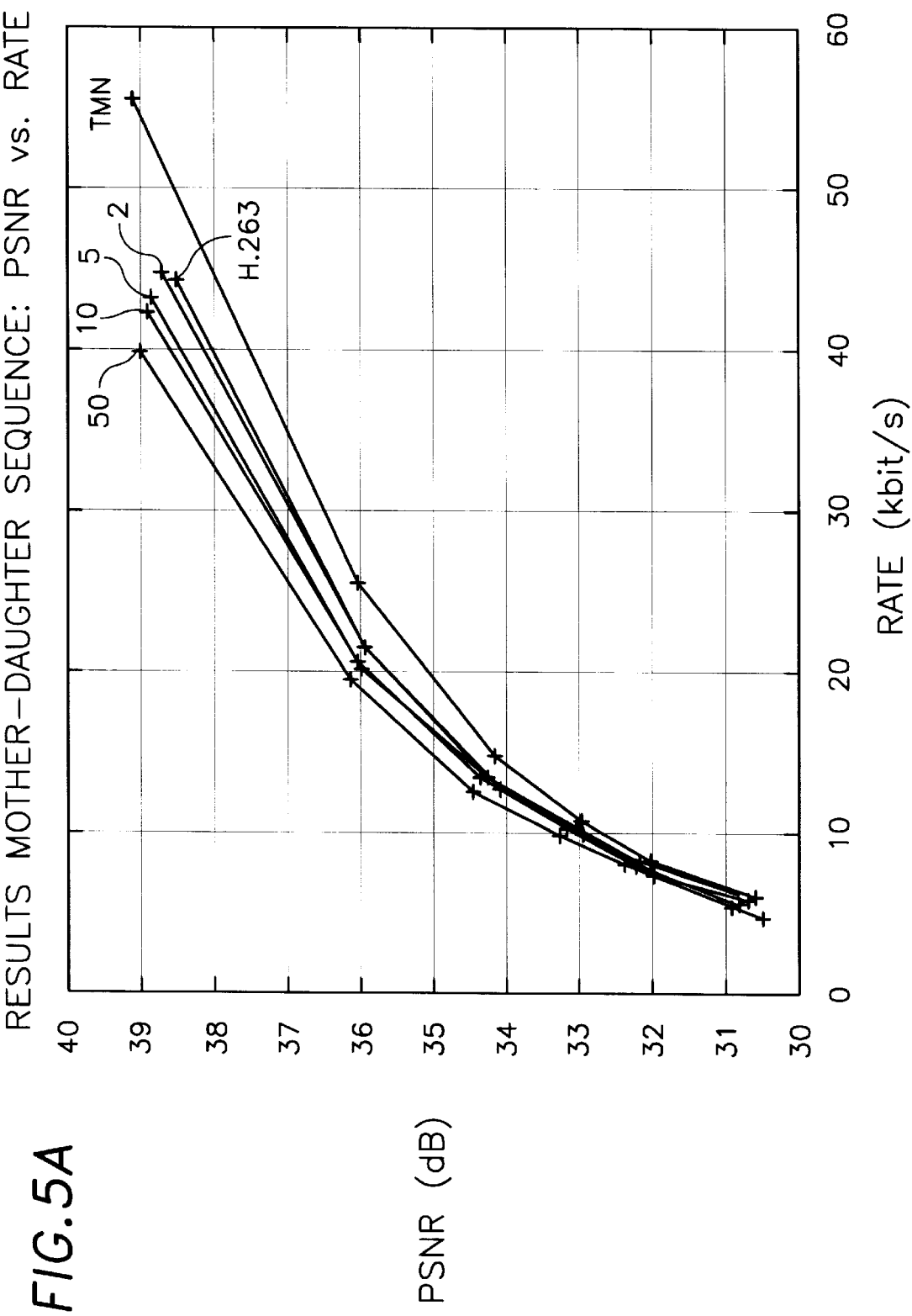
FIG. 5A shows the average PSNR with the rate distortion and the long-term memory prediction codec with FIG. 4A.

The plots of FIGS. 4A and 5A show the average PSNR from reconstructed frames produced by the TMN-2.0 codec, with the rate distortion optimized using an H.263 codec and the long-term memory prediction codec versus overall bit-rate. The size of the long-term memory is selected as 2, 5, 10, and 50 frames. The curve is generated by varying the Lagrange parameter and the DCT quantization parameter accordingly. Hence, the points marked with "+" in the plots relate to values computed from entire sequences. The long-term memory buffer is built up simultaneously at encoder and decoder by reconstructed frames. The results are obtained by measuring over frames 50 . . . 100, to avoid the effects at the beginning of the sequence.

The impact of rate-constrained encoding strategy is visible when comparing the presently-discussed H.263 codec with TMN-2.0. In connection with the present invention, it has been observed that the usage of the full search range [−16 . . . 15]×[−16 . . . 15] for the 8×8 displacement vectors provides most of the gain for this H.263 codec. The TMN-2.0 coder only permits the use of half-pixel positions that surround the previously found 16×16 displacement vector, which is searched in the range [−16 . . . 15]×[−16 . . . 15]. Herewith, it has also been observed that extending the search range for the 8×8 displacement vectors leads to improved coding performance for the rate-constrained motion estimation discussed herein, whereas for the TMN-2.0, worse results are realized, since no rate-constraint is employed. This effect is even stronger, in case of long-term memory MCP.

When comparing long-term memory MCP to TMN-2.0, the PSNR gains achieved are about 2 dB for the Foreman sequence and 1.5 dB for Mother-Daughter when using a memory of 50 frames. For both sequences, a PSNR gain of 0.6 dB is due to the rate distortion optimization while the rest comes from the use of long-term memory prediction.

These results demonstrate that utilizing the long-term memory, an improved motion-compensating prediction scheme is realized. The gains tend to decrease to negligible levels for very low bit-rates. This is consistent with the relationship of MCP and ECVQ, ("entropy constrained vector quantization") since as the effective code book size for ECVQ becomes smaller also the effective long-term memory size becomes smaller when the bit-rate is reduced.

Figure 4B:
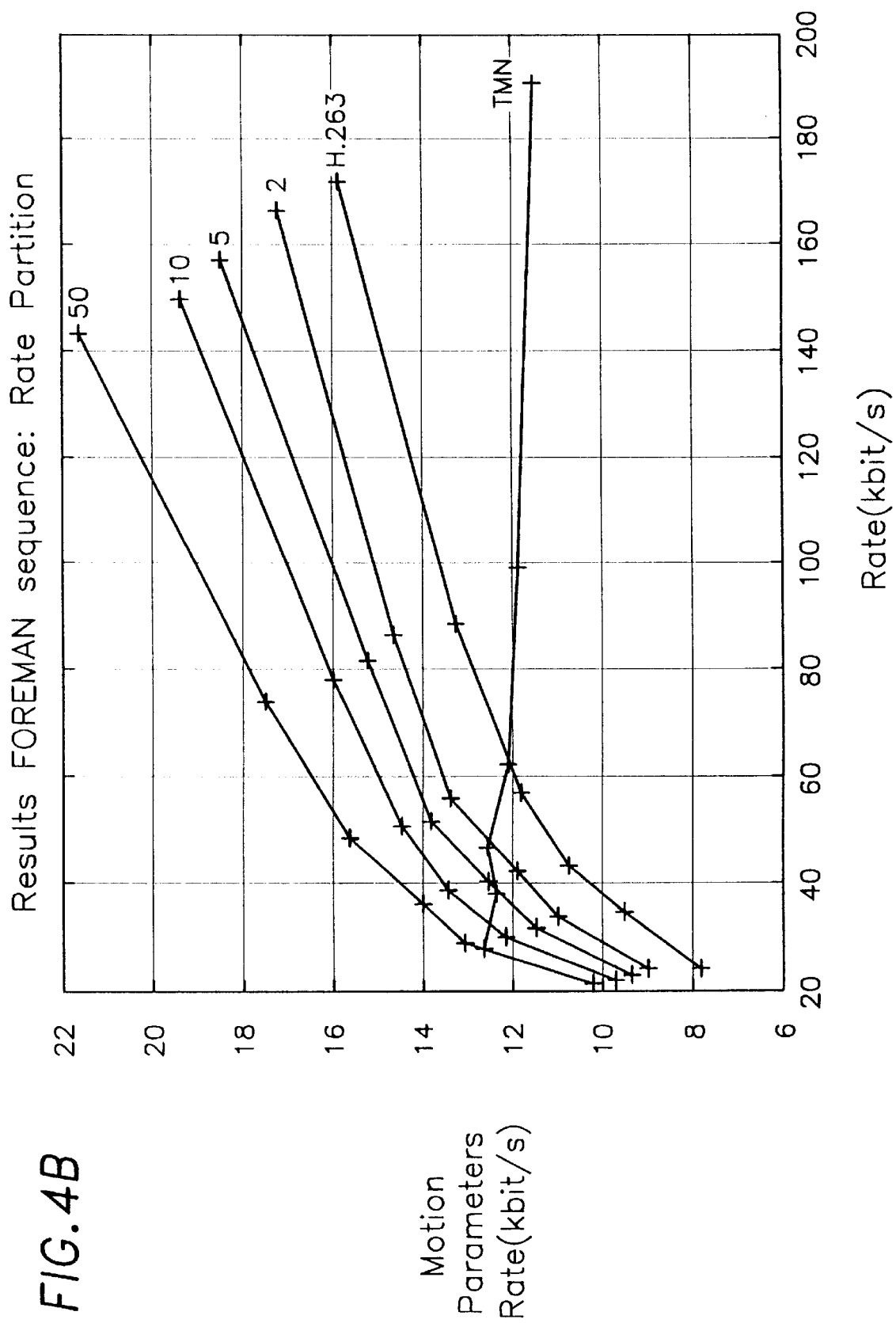
FIG. 4B shows plots illustrating the amount of bit rate used for the motion parameters versus the overall bit used between an encoding station and a communicatively coupled decoding station for the example predictor arrangement addressed in connection with FIG. 4A.
Figure 5B:
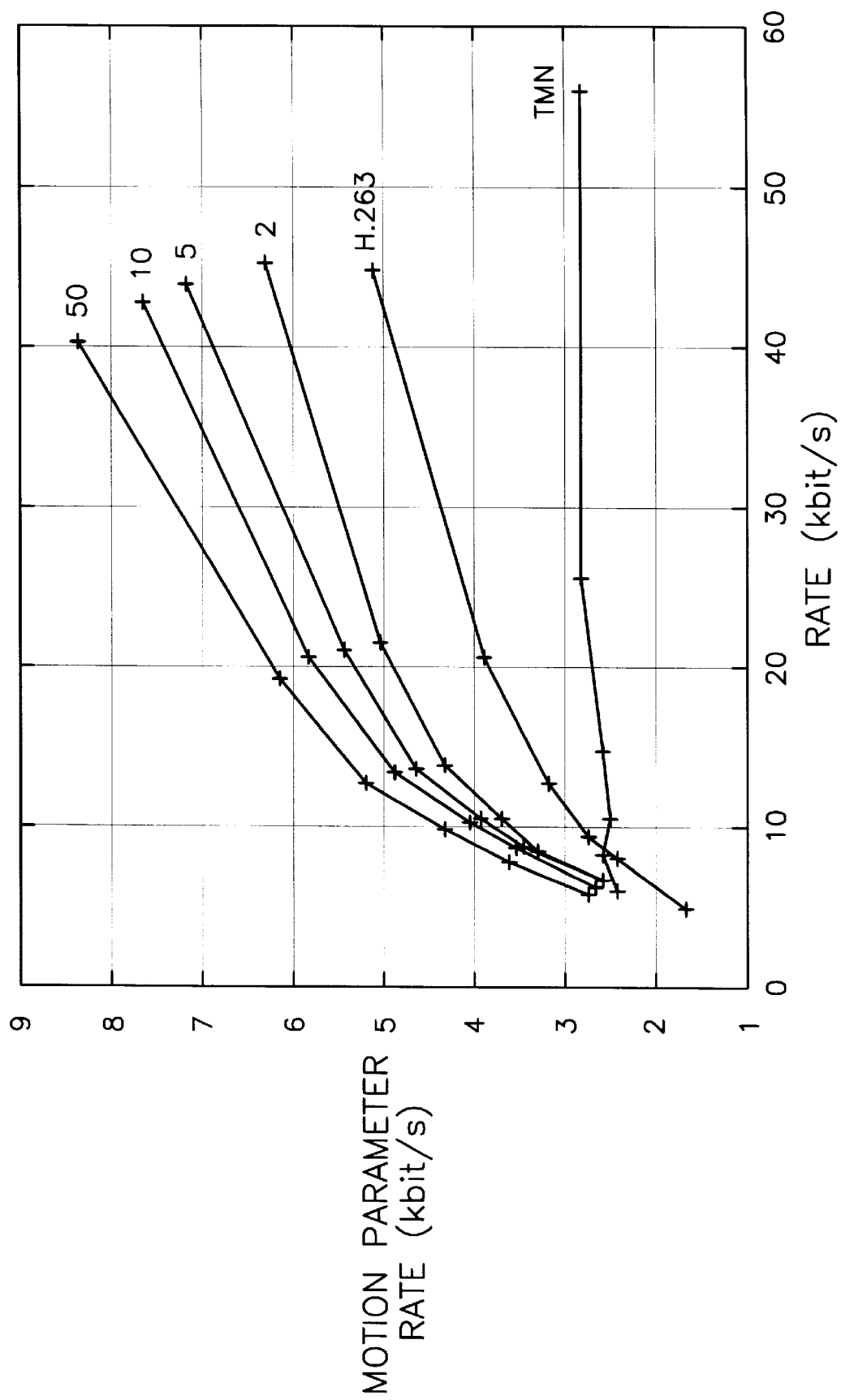
FIG. 5B shows plots illustrating the amount of bit rate used for the motion parameters versus the overall bit used between an encoding station and a communicatively coupled decoding station for the example predictor arrangement addressed in connection with FIG. 4A.

The plots of FIGS. 4B and 5B show the amount of bit-rate used for the motion parameters vs. overall bit-rate. As the long-term memory size increases, the amount of bit-rate for the motion parameters increases. But this increase is well compensated by the reduction in bit-rate for the residual coding. The decrease of the motion bit-rate for TMN-2.0 coder measured on the Foreman sequence results from the fact that motion estimation is performed using the reconstructed frames (for TMN-2.0 as well as for the presently-discussed coder). As bit-rate decreases, these reconstructed frames get noisier and since the regularization by the rate-constraint is missing for the TMN-2.0, the estimates for the motion data get noisier, requiring a higher bit-rate.

For further information concerning hardware and/or firmware structures that may be used to implement the compression/decompression and prediction functions described above, reference may be made to U.S. Pat. 5,901, 248 and to 5,594,813, both entitled "Programmable Architecture and Methods for Motion Estimation," incorporated herein by reference and assigned to the instant Assignee.

Accordingly, a video coding arrangement which uses motion-compensated long-term memory prediction to provide a significantly advanced video codec and thereby realize improved rate distortion performance. The various embodiments described above are provided by way of illustration only and should not be construed to limit the invention. Based on the above discussion and the references mentioned (each of which is incorporated herein by reference, those skilled in the art will readily recognize various modifications and changes which may be made to the present invention without strictly following the exemplary embodiments and applications illustrated and described herein. For example, the above blocks of FIGS. 1–3 can be implemented using various forms of digital signal processors and/or discrete programmable devices. Moreover, while the motion-compensated long-term memory prediction is largely a function of the rate-constrained encoding strategy, other variables and strategies can also play a part. Such modifications and changes do not depart from the true spirit and scope of the present invention which is set forth in the following claims.

What is claimed is:

1. A method of coding and decoding video images for transmission from a first station to a second station, the method comprising:

providing respective sets of multiple reference pictures at the first and second stations to permit use of up to frames N for prediction, where N is a positive integer;

encoding the video images at the first station;

at the first station, determining motion parameters, including a frame selection parameter and a spatial displacement parameter, for the video images as a function of at least one of: a distortion criteria and a data transmission rate;

transmitting the encoded video images and the motion parameters to the second station; and predicting a new video image for display at the second station as function of the motion parameters and a group of the N frames.

2. A method of coding and decoding video images, according to claim 1, wherein, determining the motion parameters includes determining a motion vector and time delay information.

3. A method of coding and decoding video images, according to claim 1, wherein, determining the motion parameters includes determining the spatial displacement parameters as polynomial motion coefficients.

4. A method according to claim 1, wherein the step of determining includes executing a minimization of a Lagrangian cost function.

5. A method, according to claim 1, wherein the motion parameters are determined as a function of both a distortion criteria and a data transmission rate.

6. A method according to claim 1, wherein the step of determining the motion parameters is a computed as a function of a minimization of a Lagrangian cost function based on both a distortion criteria and a data transmission rate.

7. An arrangement for coding and decoding video images for transmission from a first station to a second station, the method comprising:

memories for storing respective sets of multiple reference pictures at the first and second stations to permit use of up to frames N for prediction, where N is a positive integer;

an encoder responsive to video images provided at the first station and arranged to generate encoded video images;

means for determining motion parameters, including a frame selection parameter and a spatial displacement parameter, for the video images as a function of at least one of: a distortion criteria and a data transmission rate; and means, responsive to the encoded video images and the motion parameters, for predicting a new video image for display at the second station as function of the motion parameters and a group of the N frames.

8. An arrangement for coding and decoding video images, according to claim 7, wherein said motion parameters are determined as a function of a distortion criteria and a data transmission rate.

* * * * *

UNITED STATES PATENT AND TRADEMARK OFFICE
CERTIFICATE OF CORRECTION

PATENT NO. : 6,249,318 B1
DATED : June 19, 2001
INVENTOR(S) : Girod et al.

It is certified that error appears in the above-identified patent and that said Letters Patent is hereby corrected as shown below:

<u>Title page,</u>
Item [56], References Cited, OTHER PUBLICATIONS, "Stuty Group 15, Working Pary" should read -- Study Group 15, Working Party --.

<u>Column 4,</u>
Line 30, "turn to a" should read -- turn responsive to a --.

Signed and Sealed this

Fifth Day of April, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,249,318 B1 | Page 1 of 1 |
| APPLICATION NO. | : 08/928356 | |
| DATED | : June 19, 2001 | |
| INVENTOR(S) | : Girod et al. | |

It is certified that error appears in the above-identified patent and that said Letters Patent is hereby corrected as shown below:

Col. 12, line 35, claim 7: "method comprising" should read --arrangement comprising--.

Signed and Sealed this

Seventeenth Day of August, 2010

David J. Kappos
*Director of the United States Patent and Trademark Office*